United States Patent
Sasaki

(10) Patent No.: US 10,200,589 B2
(45) Date of Patent: Feb. 5, 2019

(54) AUTOFOCUS APPARATUS AND OPTICAL APPARATUS

(71) Applicant: CANON KABUSHIKI KAISHA, Tokyo (JP)

(72) Inventor: Kenichi Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/179,311

(22) Filed: Jun. 10, 2016

(65) Prior Publication Data

US 2016/0366329 A1    Dec. 15, 2016

(30) Foreign Application Priority Data

Jun. 12, 2015  (JP) ................................. 2015-118883

(51) Int. Cl.
    *H04N 5/232*    (2006.01)
    *H04N 5/365*    (2011.01)

(52) U.S. Cl.
    CPC ....... *H04N 5/23212* (2013.01); *H04N 5/3656* (2013.01)

(58) Field of Classification Search
    CPC ................... H04N 5/23212; H04N 5/3656
    See application file for complete search history.

(56) References Cited

U.S. PATENT DOCUMENTS

| 6,154,253 A * | 11/2000 | Kiri ........................... G02B 7/32 348/345 |
| 9,377,601 B2 * | 6/2016 | Kusaka ..................... G02B 7/34 |
| 2010/0208122 A1 * | 8/2010 | Yumiki ................... G02B 7/021 348/333.08 |
| 2016/0028948 A1 * | 1/2016 | Omori ................ H04N 5/23229 348/239 |

FOREIGN PATENT DOCUMENTS

| JP | 5106146 B | 12/2012 |
| JP | 5164493 B | 3/2013 |

\* cited by examiner

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An autofocus apparatus includes a control unit configured to set an offset amount based on information relating to a shape of a first high-frequency component of an image signal obtained by photoelectrically converting an object image formed by an image pickup optical system that includes a focus lens while driving the focus lens, and to move the focus lens to a position that shifts from a first position of the focus position by a sum of the offset amount and a predetermined amount that is determined by characteristic information of the image pickup optical system.

18 Claims, 12 Drawing Sheets

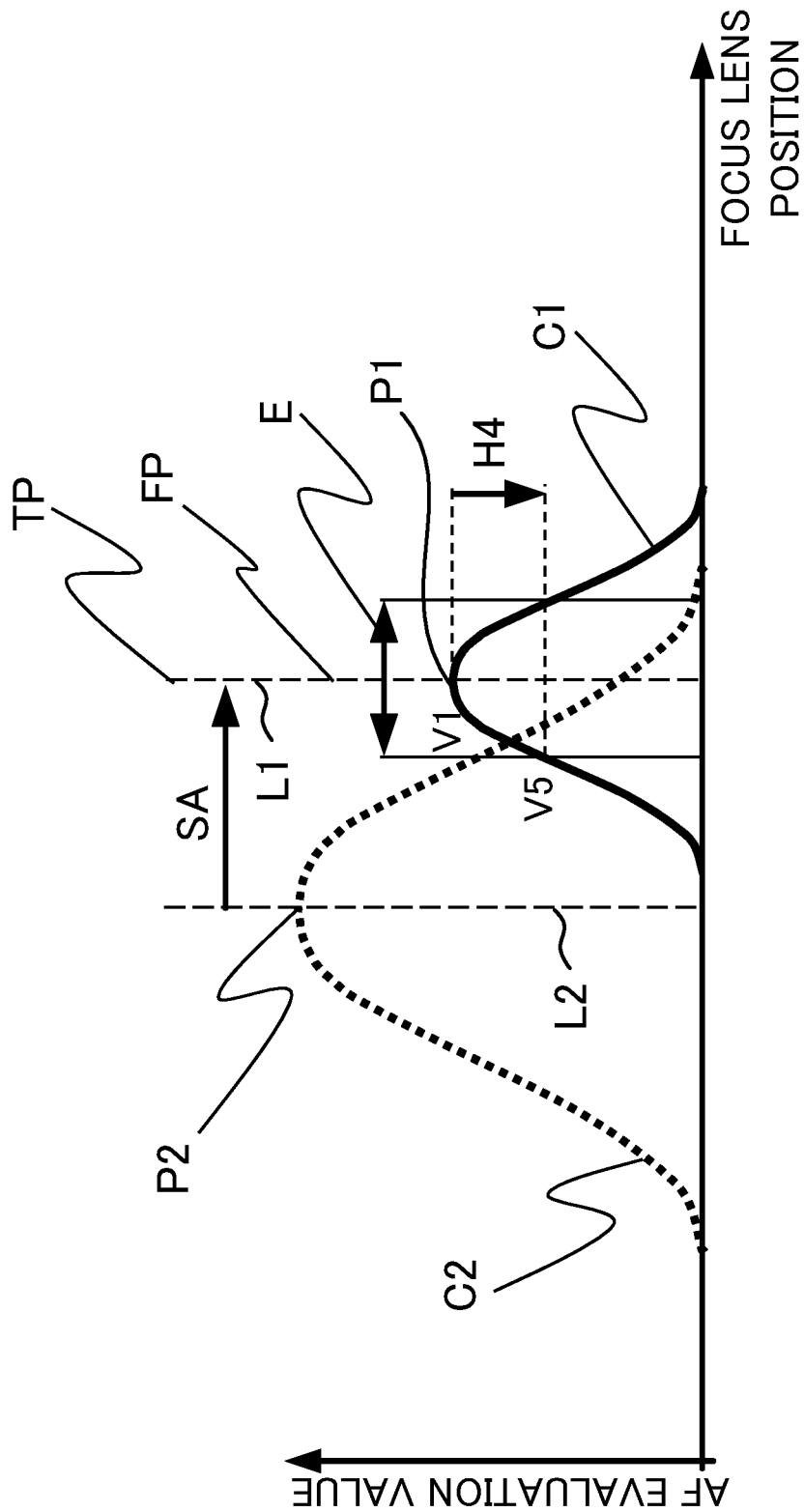

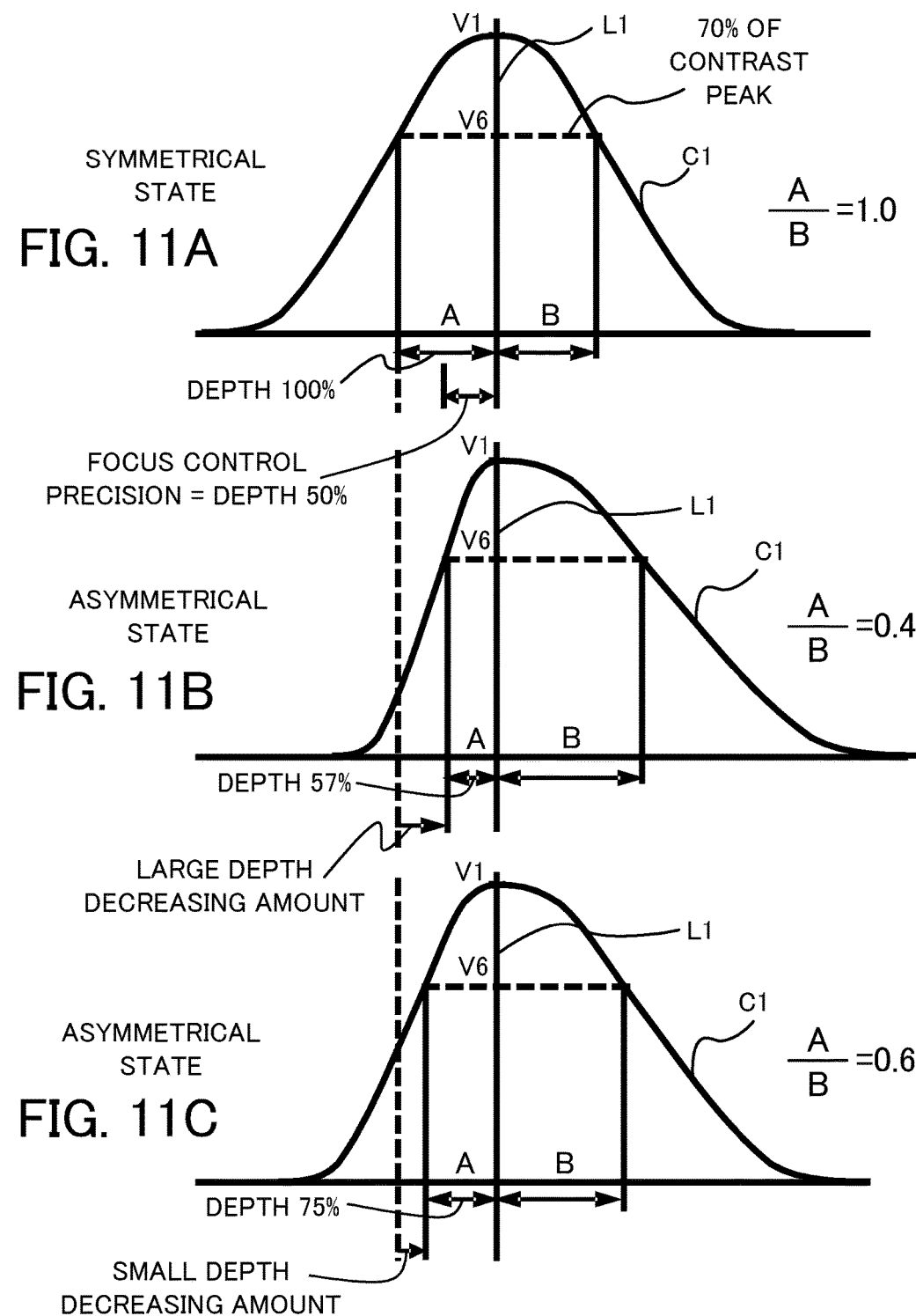

SYMMETRICAL STATE

50% OF CONTRAST PEAK

DEPTH 100%

ASYMMETRICAL STATE
C>0.20 ∩ D<0.08

TANGENT SLOPES C AND D AT POSITION OF 50% OF CONTRAST PEAK

LARGE DEPTH DECREASING AMOUNT

DEPTH 57%

ASYMMETRICAL STATE
C>0.10 ∩ D<0.06

SMALL DEPTH DECREASING AMOUNT

DEPTH 75%

AUTOFOCUS APPARATUS AND OPTICAL APPARATUS

BACKGROUND OF THE INVENTION

Field of the Invention

The present invention relates to an autofocus ("AF") apparatus and an optical apparatus.

Description of the Related Art

A contrast focus detecting (contrast AF) method is known as a focus detecting method for extracting a spatial frequency of a high-frequency component from an image signal obtained from an image sensor and for detecting, as an in-focus position, a peak position of an AF evaluation value that is a contrast value of the spatial frequency. In general, the peak position of the AF evaluation value is different according to spatial frequencies of objects due to the aberration of an image pickup optical system. An object having a higher spatial frequency is more sensitive to defocus, and the defocus is likely to appear as an image blur (image quality drop). The contrast AF thus needs to detect an in-focus position using a frequency component that is as high as possible. However, a higher frequency component to be extracted is more likely to be affected by noises etc. Then, the detecting reliability of this frequency component is likely to lower, and the AF accuracy or image quality is likely to deteriorate.

Japanese Patent No. ("JP") 5,106,146 proposes an AF apparatus that sets one of a plurality of filters each used to extract a high-frequency component, based on the illuminance in image capturing, and moves a focus lens from an obtained in-focus position to a position that shifts by a predetermined amount determined by characteristic information of image pickup optical system. JP 5,164,493 discloses a method for moving the focus lens by the predetermined amount in a defocus direction for the center of the image and in a focus improving direction for the periphery of the image.

Due to the recent demands for a smaller size, a thinner profile, and a larger aperture diameter of the image pickup apparatus, a wider image circle, and a higher magnification of a zoom lens, it becomes difficult to restrain the aberration of the image pickup optical system and the asymmetry with respect to the peak position increases as the spatial frequency of the object becomes higher. The AF evaluation value remarkably drops with a slight defocus on the steep slope side of the asymmetry. The predetermined amounts in JPs 5,106,146 and 5,164,493 are affected by errors, such as a manufacturing error (individual difference) of each lens in the image pickup optical system, an assembly error, etc. Hence, in moving the focus lens according to the teachings in JPs 5,106,146 and 5,164,493, the image quality may drastically deteriorate on the steep slope side of the asymmetry.

SUMMARY OF THE INVENTION

The present invention provides an autofocus apparatus and an optical apparatus, which can provide autofocus so as not to restrain the image quality from significantly deteriorating.

An autofocus apparatus according to one aspect of the present invention includes a control unit configured to set an offset amount based on information relating to a shape of a first high-frequency component of an image signal obtained by photoelectrically converting an object image formed by an image pickup optical system that includes a focus lens while driving the focus lens, and to move the focus lens to a position that shifts from a first position of the focus position by a sum of the offset amount and a predetermined amount that is determined by characteristic information of the image pickup optical system. At least one processor or circuit is configured to perform a function of the control unit.

Further features of the present invention will become apparent from the following description of exemplary embodiments with reference to the attached drawings.

BRIEF DESCRIPTION OF THE DRAWINGS

FIG. 5 is a graph for explaining a focusing method according to the first embodiment of the present invention.

FIGS. 11A to 11C are views for explaining conditional expressions 1 and 2 according to the first embodiment.

DESCRIPTION OF THE EMBODIMENTS

Figure 1:
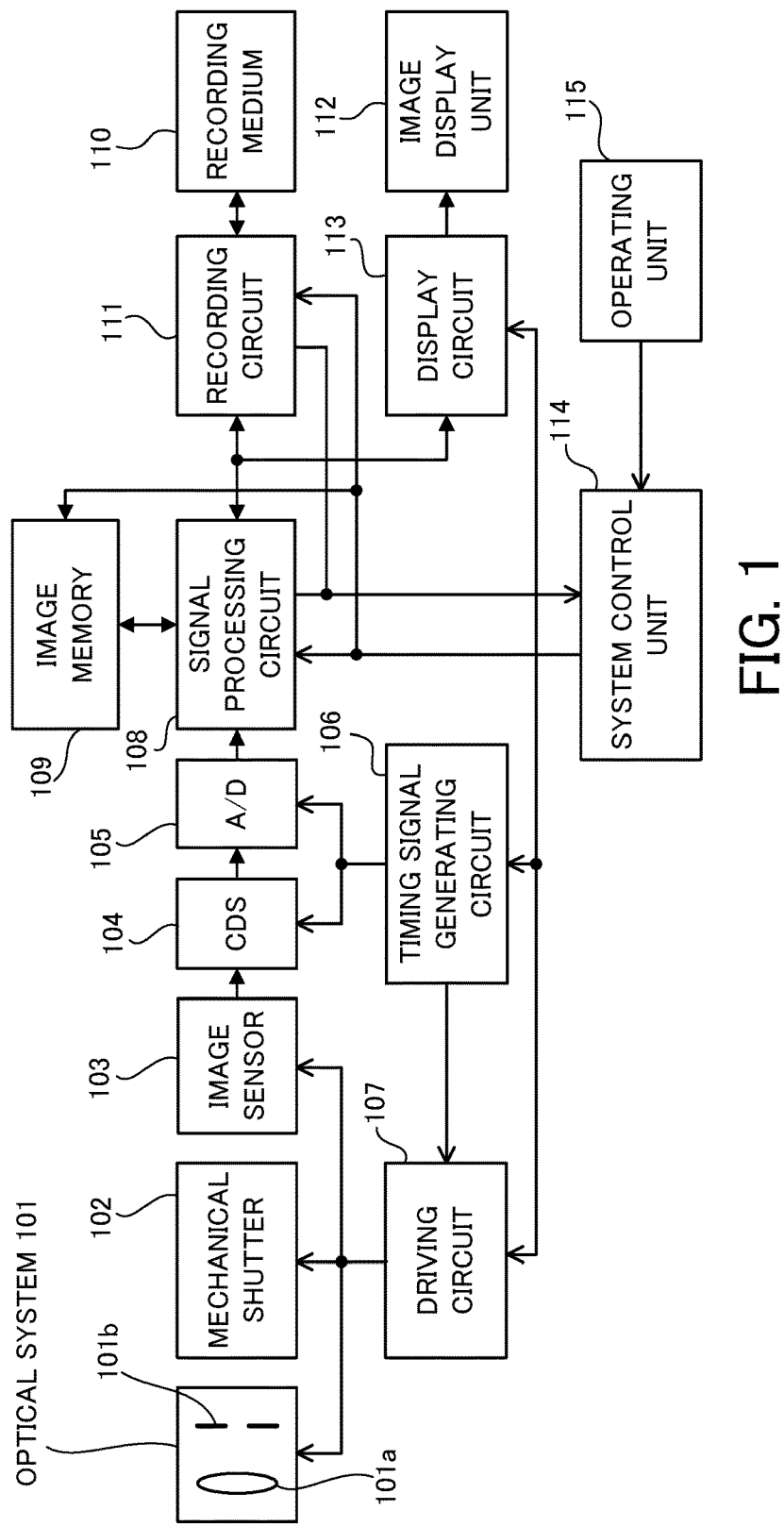
FIG. 1 is a block diagram of an image pickup apparatus according to first and second embodiment of the present invention.

FIG. 1 is a block diagram of an image pickup apparatus according to this embodiment. The image pickup apparatus is a digital still camera, a digital video camera etc., and may be a lens integrated type or a lens interchangeable type. This embodiment is applicable to both motion image pickup and still image pickup. The optical apparatus according to the present invention may be a camera body (image pickup apparatus) or an interchangeable lens.

Reference numeral 101 denotes an (image pickup) optical system configured to form an object image, and is provided in an interchangeable lens (lens apparatus) in case of the lens interchangeable type. The optical system 101 includes a focus lens 101a, a zoom lens (magnification varying lens), an image stabilization lens, a diaphragm 101b, etc. The focus lens 101a is moved in the optical axis direction for focusing. The zoom lens is moved in the optical axis direction and varies a focal length. The image stabilization lens is moved in a direction orthogonal to the optical axis and corrects an image blur by shifting the optical axis. The orthogonal direction may include a component orthogonal to the optical axis and is moved oblique to the optical axis. The diaphragm 101b adjusts a light quantity, and may be an iris diaphragm and an aperture stop.

Reference numeral 102 denotes a mechanical shutter configured to open and close at a set shutter speed and to stop exposure. Reference numeral 103 is an image sensor, such as a CCD and a CMOS, configured to photoelectrically convert an object image formed by the optical system 101.

Reference numeral 104 denotes a CDS/AGC circuit (simply illustrated as "CDS" in FIG. 1). The CDS/AGC circuit 104 includes a CDS circuit configured to remove an amplified noise and a reset noise by correlation double sampling in a front stage, and an AGC circuit configured to automatically adjust a gain according to an output in a back stage. Reference numeral 105 is an A/D converter configured to convert an analogue signal into a digital signal.

Reference numeral 106 denotes a timing signal generating circuit configured to generate a signal for operating the image sensor 103, the CDS/AGC circuit 104, and the A/D converter 105. Reference numeral 107 denotes a driving circuit (driving unit) for the optical system 101, the mechanical shutter 102, and the image sensor 103.

Reference numeral 108 is a signal processing circuit (signal processing unit) configured to perform necessary signal processing for an image signal obtained from the image sensor 103. The signal processing circuit 108 extracts a high-frequency component in an input digital image signal using a high-pass filter ("HPF") etc., and serves to calculate an AF evaluation value corresponding to a contour component amount etc. on the high-frequency side by a cumulative addition etc. More specifically, the signal processing circuit 108 extracts the high-frequency component in the image signal corresponding to an area of part of an image designated as an AF frame, and performs a cumulative addition etc. A low-pass filter ("LPF") is generally provided in front of the HPF in order to cancel noises. Thus, the signal processing circuit 108 is actually constituted by a band-pass filter ("BPF") configured to extract a high-frequency component from an image signal, and serves as a high-frequency component detecting unit. The signal processing circuit 108 serves as a detecting unit configured to detect an in-focus position based on the high-frequency component of the image signal extracted via the BPF from the image signal obtained by driving the focus lens 101a, but the system control unit 114, which will be described later, may have this function.

Reference numeral 109 is an image memory configured to store a processed image signal. Reference numeral 110 denotes an image recording medium detachable from the image pickup apparatus. Reference numeral 111 denotes a recording circuit configured to record the processed image signal into the image recording medium 110. Reference numeral 112 denotes an image display unit, such as an LCD, configured to display a processed image signal. Reference numeral 113 denotes a display circuit configured to display the image on the image display unit 112.

Reference numeral 114 denotes a system control unit (controller) configured to control the entire image pickup apparatus, and includes a microcomputer. The system control unit 114 may be a camera control unit in the camera body in case of the lens interchangeable type, and communicates with a lens control unit in the interchangeable lens (lens apparatus).

The system control unit 114 has a storage unit, such as a ROM and a RAM, configured to store a program and necessary data. The storage unit stores information of a designed value of the optical system 101. The information of the designed value of the optical system 101 contains, for example, information relating to a moving amount SA of the focus lens 101a from the peak position of the AF evaluation value in the high-frequency component to the in-focus position, information indicative of a located side of a steep slope area D11 with respect to the peak position in the high-frequency component, etc. The information of the optical system 101 may be previously stored in the storage unit, and acquired through a network, such as the Internet.

The system control unit 114 may constitute an autofocus apparatus according to this embodiment, but the AF apparatus may further include a signal processing circuit 108.

Reference numeral 115 denotes an operating unit used for a photographer to perform a variety of operations, and the input signal from the operating unit is sent to the system control unit 114. The operating unit 115 includes a mode selecting switch, a release switch, and an AF frame setting unit, etc.

The mode selecting switch can set a motion image mode, a still image mode, capturing modes suitable for a variety of scenes, an autofocus ("AF") mode, a manual focus ("MF") mode, etc.

The release switch has a first stroke switch SW1 and a second stroke switch SW2. The first stroke switch SW1 turns on when the release switch is half-pressed, and the second stroke switch SW2 turns on when the release switch is fully pressed.

The system control unit 114 is turned into an image pickup preparation state in accordance with an input of an ON signal from the first stroke switch SW1. In the image pickup preparation state, the object luminance is measured by an unilluminated photometer, and a focus state is detected by the contrast AF. The system control unit 114 calculates an F-number (aperture value) of the diaphragm 101b, an exposure amount (shutter speed) of the image sensor 103, etc. based on the photometric result. The system control unit 114 determines a driving amount (containing a driving direction) of the focus lens 101a so as to focus on the object based on the focus detecting result, and controls the driving circuit 107.

The "contrast AF" is known as a focus detecting method for detecting a contrast peak position of an object image through scanning that changes a relative position between the focus position formed by the optical system 101 and the image sensor 103. The contrast AF uses for the AF evaluation value the contrast value of the image signal obtained from the image sensor 103. IN this embodiment, when the operating unit 115 sets the AF, the system control unit 114 not only executes the contrast AF in a narrow sense, but also moves the focus lens 101a from the peak position detected by the contrast AF to a position that shifts by a predetermined amount SA as described later. This movement may be referred to as a "focus shift." In the AF mode, the system control unit 114 may move the focus lens 101a by a predetermined amount SA1 in a defocus direction for the center of the image and in a focus improving direction for the periphery of the image. The predetermined amount is an amount determined by the characteristic information of the optical system 101.

The system control unit 114 sends a diaphragm driving command to the driving circuit 107 in accordance with an input of the ON signal of the second stroke switch SW2 so as to set an F-number. Moreover, the system control unit 114 sends an exposure starting command to the driving circuit 107 so as to open the mechanical shutter 102 and to expose the image sensor 103.

The AF frame setting unit sets an area (AF frame) in which the AF is performed in the image signal obtained from the image sensor 103. A main object is the object specified by the AF frame. The system control unit 114 executes the AF for the AF frame set by the AF frame setting unit.

The system control unit 114 serves as an object distance information acquiring unit configured acquire object distance information (distance map). The distance map is constituted by a matrix shaped data table indicative of distance information for each small segments in an angle of view. A description will be given of a method for measuring the object distance utilizing the AF evaluation value. Initially, an M×N focus detecting area is set for an angle of view (by dividing the image signal obtained from the image sensor 103 into small segments), and the AF evaluation value is calculated for each focus detecting area by moving the focus lens 101a. The AF evaluation value is output from the signal processing circuit 108, and the system control unit 114 may also calculate the AF evaluation value based on the image signal or the output from the signal processing circuit 108. The focus lens position that maximizes the AF evaluation value is calculated for each focus detecting area based on the AF evaluation value for each focus detecting area corresponding to the calculated focus lens position, and this corresponds to object distance information for each area.

Of course, the method for acquiring the object distance information is not limited, and may use a phase difference detecting method of a focus detection (phase difference AF), a distance estimating method using an edge difference, a depth from defocus ("DFD"), a dedicated distance measuring detector for measuring a distance, etc. The image sensor may include focus detecting pixels for measuring the object distance.

The optical system 101 drives the diaphragm 101b and the lens in accordance with the control signal from the system control unit 114, and forms an object image having a properly set illuminance on the image sensor 103. The mechanical shutter 102 is driven so as to shield light to the image sensor 103 after a necessary exposure time period in association with the operation of the image sensor 103 in accordance with the control signal from the system control unit 114. When the image sensor 103 has an electronic shutter function, the necessary exposure time period may be secured with the mechanical shutter 102. The image sensor 103 is driven by a driving pulse based on an operating pulse that is generated by the timing signal generating circuit 106 controlled by the system control unit 114, and configured to photoelectrically convert the object image into the electric signal and to output it as an analog image signal. Based on the signal generated from the timing signal generating circuit 106 controlled by the system control unit 114, the CDS/AGC circuit 104 removes clock synchronous noises from the analog image signal from the image sensor 103, and the A/D converter 105 converts the resultant signal into a digital image signal.

Next, the signal processing circuit 108 controlled by the system control unit 114 performs various image processing, such as a color conversion, a white balance, and a gamma correction, resolution correcting processing, and image compression processing, for the digital image signal. The image memory 109 is used to temporarily store the digital image signal that is being processed and the digital image signal that has been processed. The image signal processed by the signal processing circuit 108 and the image signal stored in the image memory 109 are converted by the recording circuit 111 into data suitable for the image recording medium 110 and stored in the image recording medium 110. The signal processing circuit 108 performs the resolution conversion processing for the image signal, and the resultant signal is converted by the display circuit 113 into the signal suitable for the image display unit 112 and displayed on the image display unit 112.

The signal processing circuit 108 may output the digital image signal as it is to the image memory 109 and the recording circuit 111 without processing the digital image signal in accordance with the control signal from the system control unit 114. At request of the system control unit 114, the signal processing circuit 108 outputs to the system control unit 114 information of the digital image signal, such as information on a spatial frequency of the image, an average value of the designated area, a data amount of a compressed image, and information derived from that information. The recording circuit 111 outputs information of the type and the available capacity of the image recording medium 110 to the system control unit 114 at request of the system control unit 114.

Figure 2A:
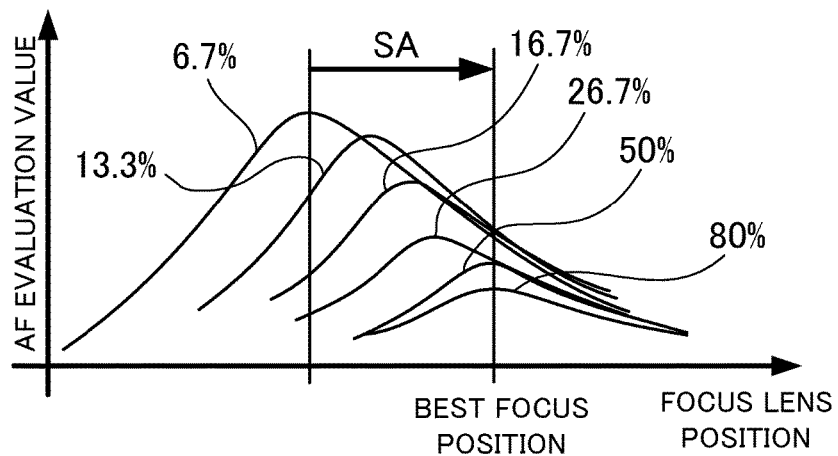
FIGS. 2A and 2B are graphs for explaining contrast AF and a relationship between an in-focus position and a spatial frequency of an object.

FIG. 2A is a view illustrating a relationship between the best focus position (in-focus position) and a position that maximizes the AF evaluation value when the BPFs having the highest filter transmittance at Nyquist frequencies of 6.7%, 13.3%, 16.7%, 26.7%, 50%, and 80%, respectively. The ordinate axis denotes a contrast value (AF evaluation value), and the abscissa axis denotes a position of the focus lens 101a. As illustrated in FIG. 2A, the peak position or the position that maximizes the AF evaluation value is different according to spatial frequencies of the object due to the aberration of the optical system 101.

When there are a plurality of frequency components having different peak positions, the contrast AF uses a higher frequency component and moves the focus lens 101a to the peak position. This is because where both an object having a high spatial frequency and an object having a low spatial frequency are captured, a blur of the object having the low spatial frequency is less likely to be visually recognized even when it is slightly defocused and a blur of the object having the high spatial frequency is likely to be visually recognized when it is slightly defocused.

However, when the BPF has the highest transmittance for the very high-frequency component, the reliability of the obtained AF evaluation value is often insufficient due to a noise, a low luminance, a blur, etc., and it becomes difficult to detect the peak position. Accordingly, the in-focus position is detected by moving the focus lens 101a to a position that shifts from the stably detectable peak position of the high-frequency component by a predetermined amount SA. As described above, the storage unit in the system control unit 114 stores the information of the predetermined amount SA. The system control unit 114 controls the driving circuit 107 so as to move the focus lens 101a to the position offset from the peak position by the predetermined amount SA determined by the characteristic information of the optical system 101.

It is merely illustrative that in FIG. 2A, the high-frequency component corresponding to the Nyquist frequency of 6.7% is the high-frequency component having the stably detectable peak position, and the high-frequency component corresponding to the Nyquist frequency of 80% is the high-frequency component that has the peak position at the in-focus position. The spatial frequency of the object having the stably detectable peak position is lower than the spatial frequency of the object having the peak position at the in-focus position.

The predetermined amount SA is affected by errors, such as a manufacturing error and an assembly error of each lens in the optical system 101. Thus, the in-focus position cannot be always obtained by moving the focus lens 101a from the stably detectable peak position of the high-frequency component by the predetermined amount SA.

Due to the recent demands for a smaller size, a thinner profile, and a larger aperture diameter of the image pickup apparatus, a wider image circle, and a higher magnification of a zoom lens, it becomes difficult to restrain the aberration of the image pickup optical system 101 and the asymmetry with respect to the peak position increases as the spatial frequency of the object becomes higher.

Figure 2B:
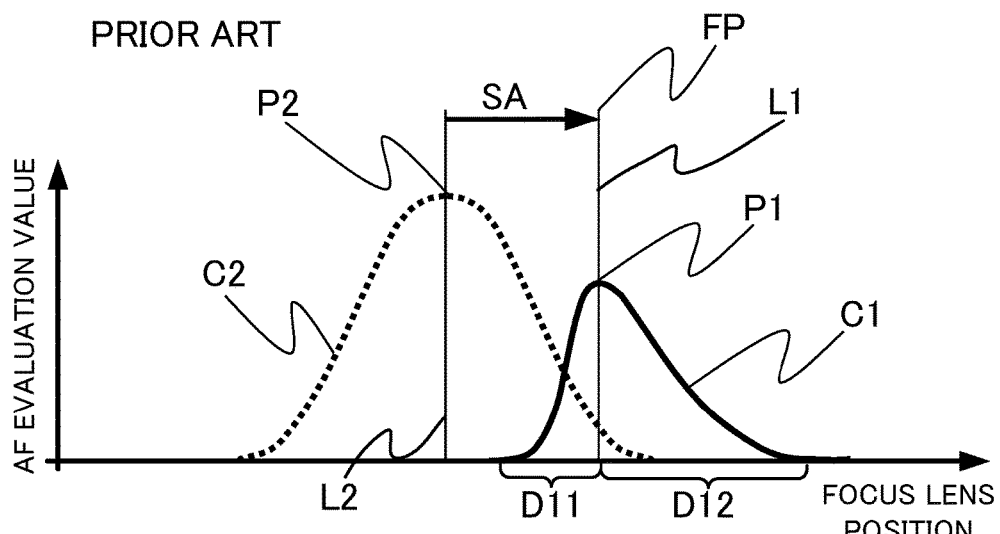

FIG. 2B is a view illustrating a high-frequency component (second high-frequency component) C2 having a stably detectable peak position P2, and a high-frequency component (first high-frequency component) C1 having a peak position P1 at an in-focus position FP. The ordinate axis and the abscissa axis are defined as in FIG. 2A.

There is no spherical aberration if the high-frequency component passes the peak position on any azimuth sections and is symmetrical with respect to a line parallel to the ordinate axis. However, when there is a spherical aberration, as illustrated by the high-frequency component C1, the high-frequency component is asymmetrical with respect to the line L1 that passes the peak position P1 and is parallel to the ordinate axis.

In the high-frequency component C1, defocus amounts are different from each other between the right and left sides from the line L1 to positions having the AF evaluation value of 0. An area D11 has a small defocus amount and a steep slope (gradient), and an area D12 has a large defocus amount and a moderate slope. In the high-frequency component C2, the asymmetry with respect to a line L2 that passes the peak position P2 and is parallel to the ordinate axis is less likely to stand out even with a large spherical aberration amount.

Even in the periphery of the image, a shape of the high-frequency component is asymmetrical with respect to the peak position due to the aberration. The spherical aberration as the longitudinal aberration is a main cause at the center of the image, and flare and halo are major aberrations having a third order or higher outside the optical axis. These aberrations are likely to remain in the diaphragm release condition of a recently demanded optical system having a small minimum F-number. As described above, the storage unit in the system control unit 114 stores information of the areas D11 and D12 (such as on which side D11 is located with respect to the line L1).

While the in-focus position FP is the position to which the focus lens 101a is moved from the peak position P2 of the high-frequency component C2 by the predetermined amount SA in FIG. 2B, this is not always the case, as described above.

Figure 3A:
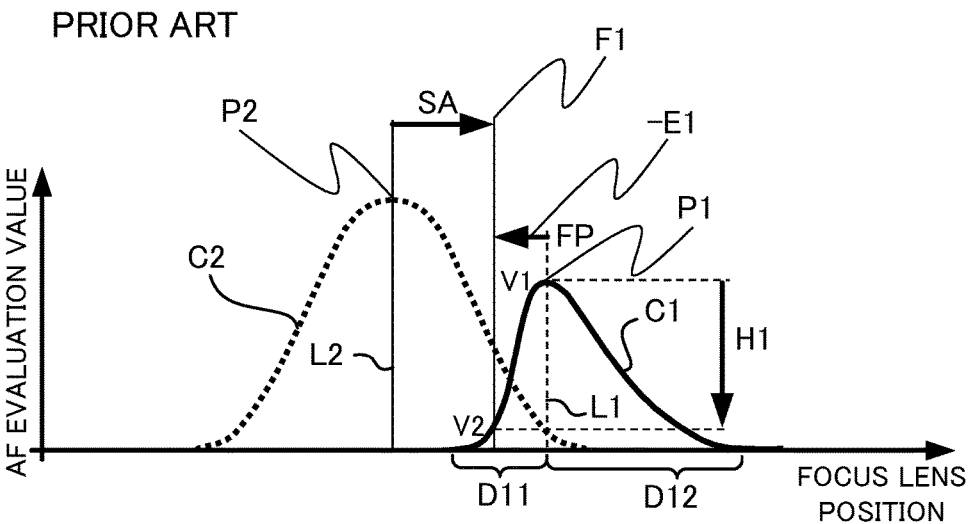
FIGS. 3A and 3B are graphs for explaining a problem in a conventional focusing method.

FIG. 3A is a graph illustrating that the predetermined amount SA contains an error of −E1 (E1>0). In this case, a final position F1 of the final focus lens 101a does not accord with the in-focus position FP, and is located in the area D11. Then, the AF evaluation value becomes V2 that is lower than the AF evaluation value of V1 at the peak position P1 by H1.

Figure 3B:
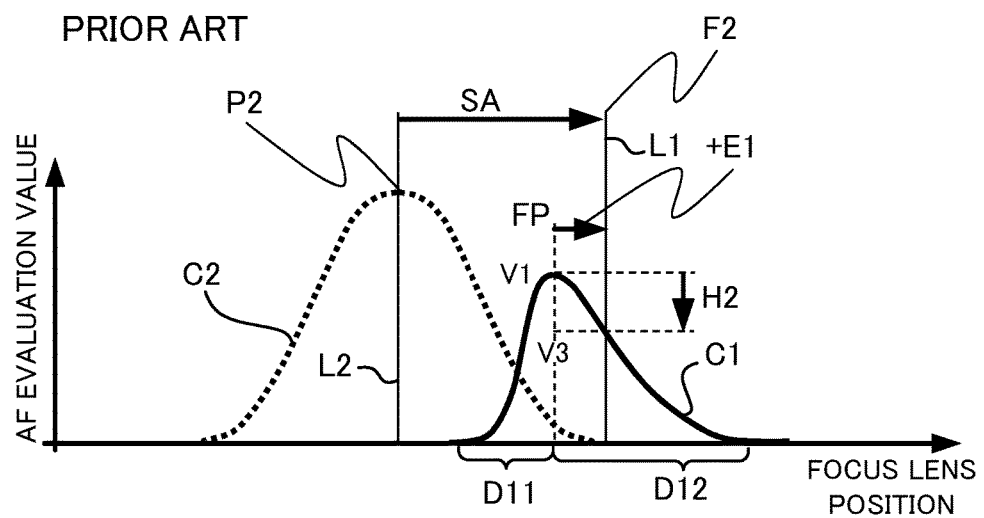

FIG. 3B is a graph illustrating that the predetermined amount SA contains an error of +E1 (E1>0). In this case, a final position F2 of the final focus lens 101a does not accord with the in-focus position FP, and is located in the area D12. Then, the AF evaluation value becomes V3 that is lower than the AF evaluation value of V1 at the peak position P1 by H2.

In FIGS. 3A and 3B, the ordinate axis and the abscissa axis are defined similarly to those in FIGS. 2A and 2B. In case of FIG. 3B, a decreased amount of H2 of the AF evaluation value is not so large that the focusing accuracy or the image quality do not significantly deteriorate. On the contrary, in case of FIG. 3A, a decreased amount of H1 of the AF evaluation value is so large that the focusing accuracy or the image quality significantly deteriorates.

First Embodiment

Figure 4:
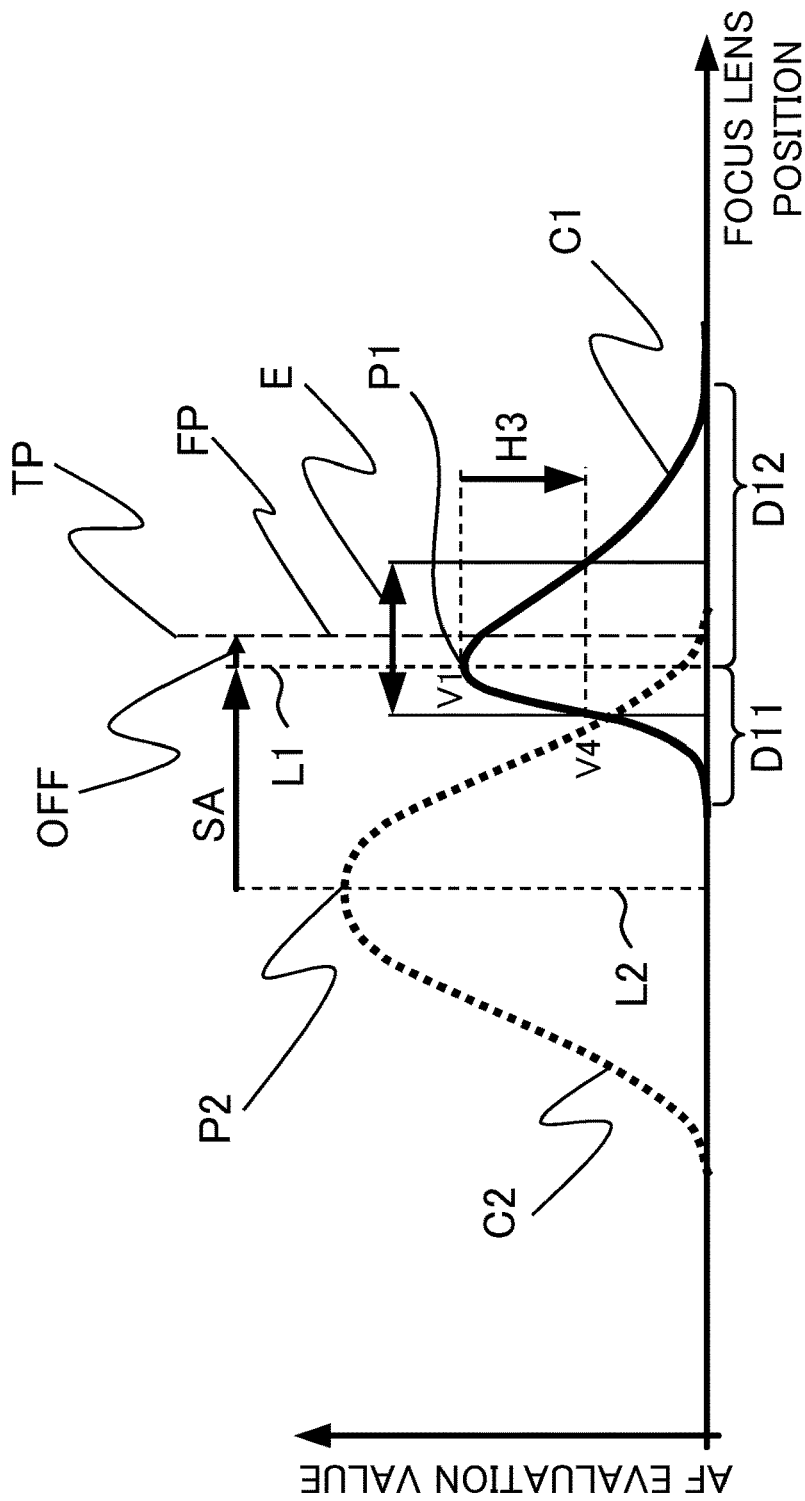
FIG. 4 is a graph for explaining a focusing method according to the first embodiment of the present invention.

FIG. 4 is a graph for explaining an AF method according to a first embodiment, and the ordinate axis and the abscissa axis are defined similarly to those in FIGS. 3A and 3B. The right direction in the abscissa axis represents a focus lens position of the focus lens 101a. Those elements in FIG. 4, which are the corresponding elements in FIGS. 3A and 3B, are designated by the same reference numerals. Both the high-frequency components C1 and C2 indicate the high-frequency components on the optical axis (at the center in the image) for a distance of 400 mm when the diaphragm is released (fully opened) at the wide-angle end of the optical system 101.

Figure 8:
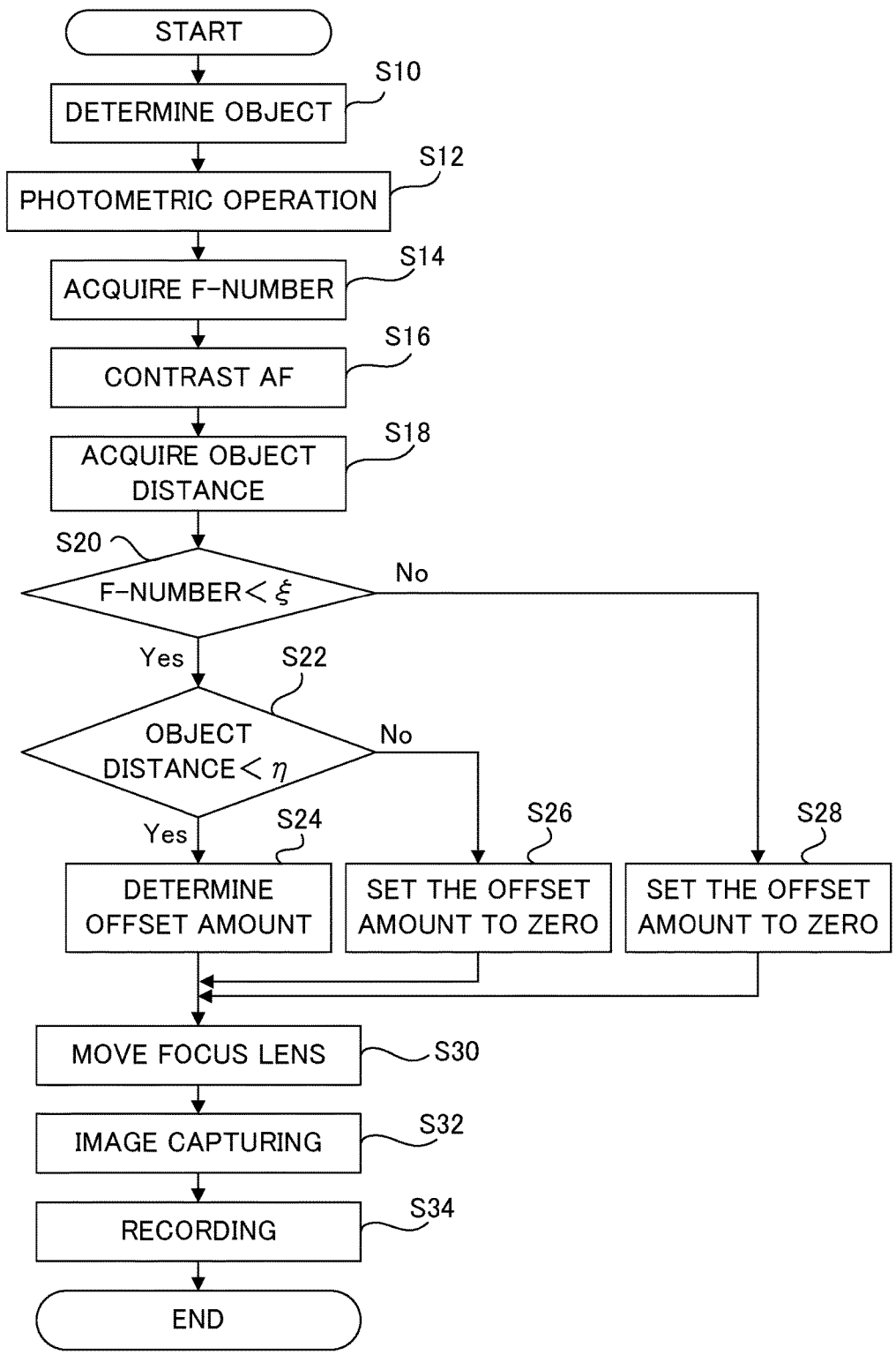
FIG. 8 is a flowchart for explaining an autofocus method executed by a system control unit according to the first embodiment of the present invention.

FIG. 8 is a flowchart for explaining the AF method according to the first embodiment executed by the system control unit 114, and "S" denotes a step. The flowcharts in FIG. 8 and other figures are implemented as a program that enables a computer to execute each step, and the program may be stored in a non-transitory computer-readable storage medium.

Initially, the system control unit 114 determines a main object using an AF frame which a photographer sets via the operating unit 115 (S10). Next, the system control unit 114 instructs the unillustrated photometer to measure the object luminance in accordance with the input of the ON signal of the first stroke switch SW1 in the operating unit 115 (S12), and acquires information of the F-number of the diaphragm 101b based on the photometric result (S14). The system control unit 114 executes the contrast AF for the object determined in S10 (S16). Since it is difficult to detect the in-focus position FP by measuring the high-frequency component C1 as illustrated FIG. 4, the peak position P2 is detected in the contrast AF. In the first embodiment, the first position is the position of the focus lens 101a corresponding to the peak position P2. Next, the system control unit 114 acquires the information of the object distance of the object determined in S10 (S18).

In the first embodiment, the system control unit 114 moves the focus lens 101a to a position that is offset from the focus lens position (first position) corresponding to the peak position P2 by a sum of an offset amount OFF and the predetermined amount SA. Thereby, even when a target position TP of the focus lens 101a has an error E (a range of ±E1), a decreased amount of the AF evaluation amount can be restrained down to H3 at most. The decreased amount of H3 of the AF evaluation value is smaller than the decreased amount of H1 illustrated in FIG. 3A, the focusing accuracy or the image quality are prevented from deteriorating. The decreased amount H3 is larger than the decreased amount of H2. In other words, the first embodiment increases the largest defocus amount (absolute value) from the peak position P1 in the area D12. In addition, this embodiment equalizes a decreased amount with the error of +E1 to a decreased amount with the error of −E1. The first embodiment is not limited to focusing on the optical axis (at the center in the image), but is applicable to focusing off the optical axis (in the periphery in the image).

In other words, the system control unit 114 sets the offset amount so that the minimum value of the AF evaluation value when the focus lens 101a is moved by a sum of the offset amount and the predetermined amount can be higher than the minimum value of the AF evaluation value obtained when the focus lens 101a is moved by a predetermined amount.

In the first embodiment, the system control unit 114 sets the offset amount OFF to be added to the predetermined amount SA based on information relating to the shape of the high-frequency component C1 with respect to the line L1 that passes the peak position P1. As described later, the "information relating to the shape of the high-frequency component C1" may be information that determines the shape of the high-frequency component C1 or information of a factor that affects the shape of the high-frequency component C1. In FIG. 8, the offset amount OFF is set based on the information of the object distance and the F-number as factors that affect the shape of the high-frequency component C1.

The system control unit 114 determines whether the F-number is smaller than a threshold (S20). The system control unit 114 sets the absolute value of the offset amount OFF when the F-number is equal to or larger than the threshold, to be smaller than the absolute value of the offset amount OFF when the F-number is smaller than the threshold.

When the F-number is smaller than the threshold $\xi$, the system control unit 114 determines whether the object distance is smaller than a threshold $\eta$ (S22). When the object distance is smaller than a threshold $\eta$, the system control unit 114 sets the offset amount OFF by referring to the storage unit when the object distance is smaller than the threshold $\eta$ (S24). The system control unit 114 sets the absolute value of the offset amount OFF when the object distance is equal to or larger than the threshold, to be smaller than the absolute value of the offset amount OFF when the object distance is smaller than the threshold.

As described above, the storage unit previously stores the relationship among the information of the object distance, the information of the F-number, the information of the designed value of the optical system 101, and the information of the offset amount OFF set for the predetermined amount SA. The format of this relationship is not particularly limited and may use a table, a graph, an expression, etc. The system control unit 114 acquires the information of the necessary offset amount OFF based on the information of the acquired object distance and the F-number and the information of the above relationship.

When the aperture in the diaphragm 101b is narrowed from the full open state, the spherical aberration reduces and the shape of the high-frequency component C1 gradually becomes symmetrical with respect to the line L1. The symmetry of the high-frequency component C1 also depends on the object distance (image pickup distance). In general, as the object distance becomes longer, the symmetry of the high-frequency component C1 improves.

FIG. 5 is a graph illustrating the high-frequency component C1 that is approximately symmetrical when the F-number is equal to or larger than the threshold $\xi$ or when the object distance is equal to or larger than the threshold $\eta$. Even when the error E (in a range of ±E1) occurs, the system control unit 114 sets the offset amount OFF to zero (S26, S28) because the AF evaluation value does not excessively drop on one side due to the symmetry of the high-frequency component C1. Thus, a decreased amount of H4 can be restrained from the AF evaluation value of V1 at the peak position by adjusting the offset amount OFF based on the degree of the symmetry of the high-frequency component C1. As the high-frequency component C1 is more highly symmetrical, the absolute value of the offset amount OFF may be set smaller but the proportional relationship is not always necessary. The offset amount for the high-frequency component C1 having a first symmetry may be smaller than the offset amount for the high-frequency component having a second symmetry higher than the first symmetry.

Thereafter, the system control unit 114 moves the focus lens 101a to a position that is offset from the peak position P2 by a sum of the offset amount OFF and the predetermined amount SA (focus shift) (S30). Next, the system control unit 114 sets the F-number by sending the diaphragm driving command to the driving circuit 107 in accordance with the input of the ON signal of the second stroke switch SW2. In addition, the system control unit 114 sends the exposure start command to the driving circuit 107 to open the mechanical shutter 102 and to expose the image sensor 103 (S32). Thereafter, the image signal is recorded in the image recording medium 110 via the recording circuit 111 (S34).

Figure 9:
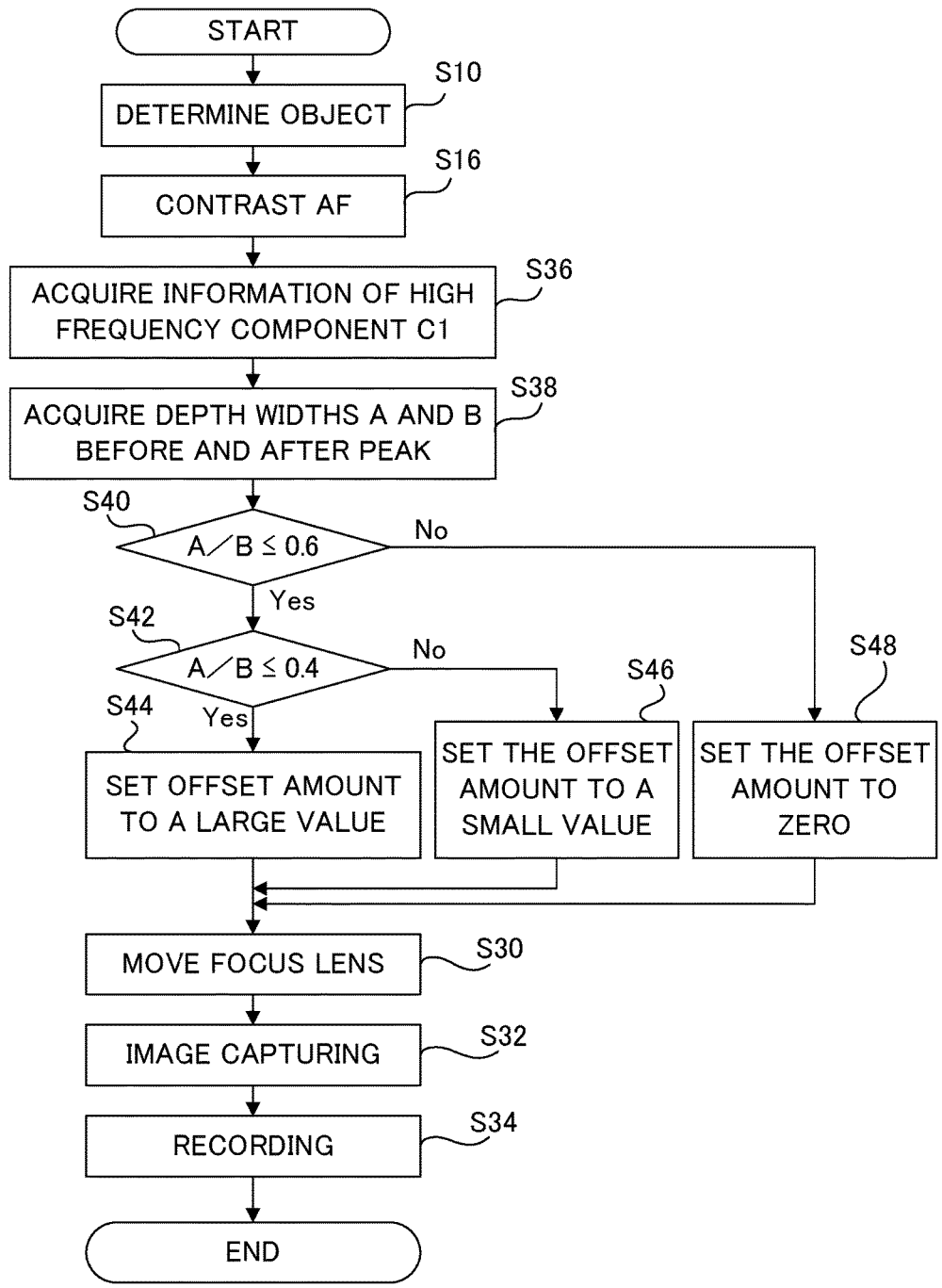
FIG. 9 is a flowchart for explaining an autofocus method executed by a system control unit according to the first embodiment of the present invention.

Next follows a description of one example where the "information relating to the shape of the high-frequency component C1" is the information that determines the shape of the high-frequency component C1. FIG. 9 is a flowchart for explaining the AF method according to the first embodiment executed by the system control unit 114, and "S" denotes a step. Those elements in FIG. 9, which are the corresponding elements in FIG. 8, will be designated by the same reference numerals. Similar to FIG. 8, S10 to S16 are performed in FIG. 9, but S12 and S14 are omitted for convenience in FIG. 9. After S16, the system control unit 114 acquires the information of the high-frequency component C1 (S36).

Figure 6A:
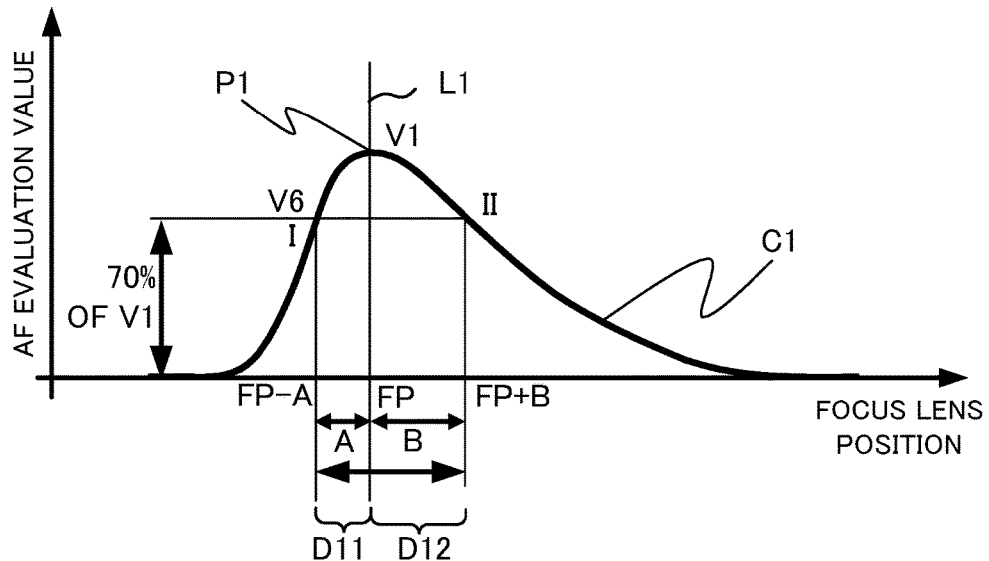
FIGS. 6A and 6B are graphs for explaining a method for determining the degree of symmetry of a high-frequency component according to the first embodiment.

FIG. 6A is a graph for explaining an example of the method for determining the degree of the symmetry of the high-frequency component C1. In the AF evaluation value of the high-frequency component C1, two positions I and II have AF evaluation values of V6 that are 70% (a predetermined ratio) of the AF evaluation value V1 at the peak position P1 and are defined before and after the line L1. The position I belongs to the area D11, and the position II belongs to the area D12. Now assume that "A" represents a defocus amount (depth) at the position I and "B" represents a defocus amount (depth) at the position II where "A" and "B" are positive values. A/B is a ratio of distances between the positon of the focus lens 101a corresponding to the peak position P1 and each of the two positions of the focus lens 101a of the high-frequency component C1 corresponding to the AF evaluation value of V6. This embodiment uses a value of the ratio equal to 1 or below but may use a value of the ratio equal to 1 or more.

The storage unit in the system control unit 114 stores the information of the high-frequency component C1 illustrated in FIG. 6A, and the system control unit 114 acquires information of A and B (S38).

When the value of the ratio (A/B) is equal to or smaller than 0.6 as in conditional expression 1 or 0.4 or as in conditional expression 2, the system control unit 114 determines that the high-frequency component C1 is asymmetrical with respect to the line L1 (non-line symmetry), and sets the offset amount OFF. The code and absolute value of the offset amount OFF are determined based on the direction (code) from the peak position P2 to the peak position P1 and the direction of the asymmetry of the high-frequency component C1.

$$\frac{A}{B} \leq 0.6 \tag{1}$$

$$\frac{A}{B} \leq 0.4 \quad (2)$$

The peak position of the high-frequency component C1 accords with the in-focus position according to the visual sensory evaluation. When the focus lens is focused on the position in which the AF evaluation value significantly reduces off the peak position, the image quality deterioration becomes impermissible. The permissible level is the predetermined ratio (which is 70%) of the AF evaluation value V1 at the peak position P1 and the necessary focus detection accuracy can be secured when the focus lens is located in this depth.

FIGS. 11A to 11C are views for explaining the basis of the conditional expressions 1 and 2. FIG. 11A illustrates that the high-frequency component C1 is symmetrical with respect to the line L1. In this case, the value of A/B is 1.0.

FIGS. 11B and 11C illustrate that the high-frequency components C1 is asymmetrical due to a large spherical aberration amount. In this case, the depth decreases on one side and increases on the other side. The decrease amount and the increase amount are not always equal to each other, and depend on the aberration state. However, they are not greatly different from each other and thus can be considered equivalent with each other. Assume that the depth is narrowed by 43% on one side of the depth and the depth on the other side increases by 43%. Then, the depth ratio before and after the peak position P1 is expressed by conditional expression 3, as illustrated in FIG. 11B. In this case, the depth on one side is about 2.5 times of that on the other side and the asymmetry is remarkable.

$$\frac{A}{B} = 0.4 \quad (3)$$

The necessary focus control accuracy is 50% for the depth defined by 70% of the AF evaluation value of V1. In case of the conditional expression 3, on the sharply reducing side of the contrast, the depth becomes 57% where it is assumed that the original depth is set to 100%. Then, the margin becomes 7% for the necessary focus detecting accuracy of 50% of the original depth. In such a small margin, the depth may be lower than 70% of the AF evaluation value of V1 under influence of even slight disturbance.

FIG. 11C illustrates that the depth is narrowed by 25% on one side and the depth increases by 25% on the other side. Then, the depth ratio before and after the peak position P1 becomes as expressed by conditional expression 4, and the depth on one side is about 1.67 times of the depth on the other side.

$$\frac{A}{B} = 0.6 \quad (4)$$

In this case, the depth on the sharply reducing side of the contrast is 75% of the original depth, and has a margin of 25% for the depth of 50% of the focus system, increasing the latitude to the disturbance.

When the conditional expressions 1 or 2 are not satisfied because the iris diaphragm is narrowed or the object distance exceeds 1000 mm, the system control unit 114 determines that the asymmetry is permissible and sets the offset amount OFF to 0 and the peak position P1 to the target position. The AF evaluation value V6 is set to 70% of the AF evaluation value of V1 because the AF evaluation value is close to the peak position P1, the asymmetry is less likely to appear, and the detecting sensitivity of the asymmetry is high.

The system control unit 114 sets the absolute value of the offset amount OFF when the ratio value is larger than the threshold, to be smaller than the absolute value of the offset amount OFF when the ratio value is equal to or smaller than the threshold. The system control unit 114 initially determines whether A/B is equal to 0.6 or smaller (S40). When A/B is equal to 0.6 or smaller, the system control unit determines whether A/B is equal to 0.4 or smaller (S42). When A/B is equal to 0.4 or smaller, the system control unit 114 sets the offset amount OFF by referring to the storage unit similar to S24 (S44). When A/B is larger than 0.4, the system control unit 114 sets the offset amount OFF by referring to the storage unit, similarly to S24 (S46) but the absolute value of the set offset amount is smaller than that set in S44. When A/B is larger than 0.6, the system control unit 114 sets the offset amount OFF to zero similarly to FIG. 5 (S48). The system control unit 114 then performs S30, S32, and S34.

Figure 10:
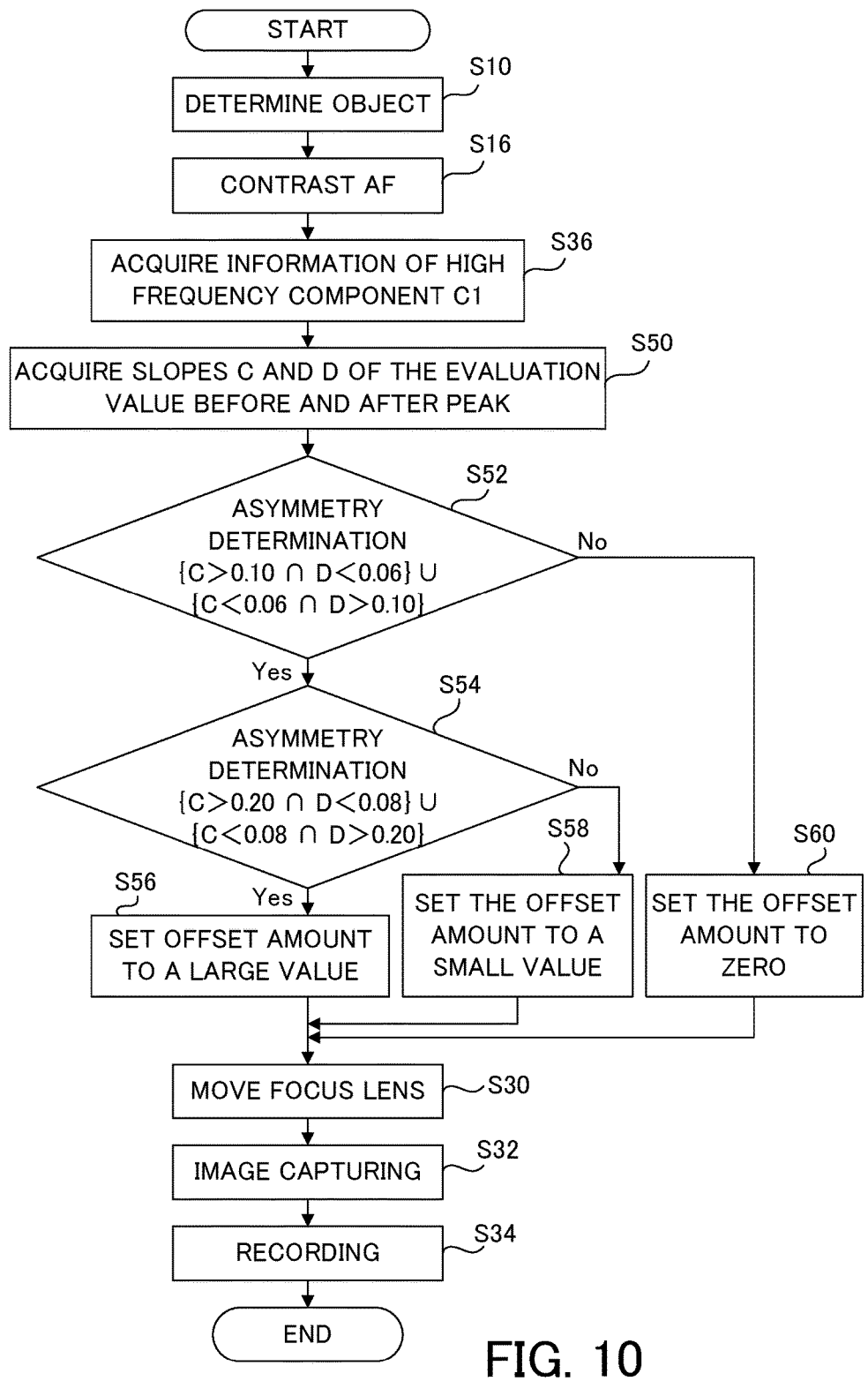
FIG. 10 is a flowchart for explaining an autofocus method executed by a system control unit according to the first embodiment of the present invention.

Next follows a description of another example where the "information relating to the shape of the high-frequency component C1" is the information that determines the shape of the high-frequency component C1. FIG. 10 is a flowchart for explaining the AF method according to the first embodiment executed by the system control unit 114, and "S" denotes a step. Those elements in FIG. 10, which are the corresponding elements in FIGS. 8 and 9, will be designated by the same reference numerals. Similar to FIG. 8, S10 to S16 are performed in FIG. 10, but S12 and S14 are omitted for convenience in FIG. 10. After S16, S36 is performed.

Figure 6B:
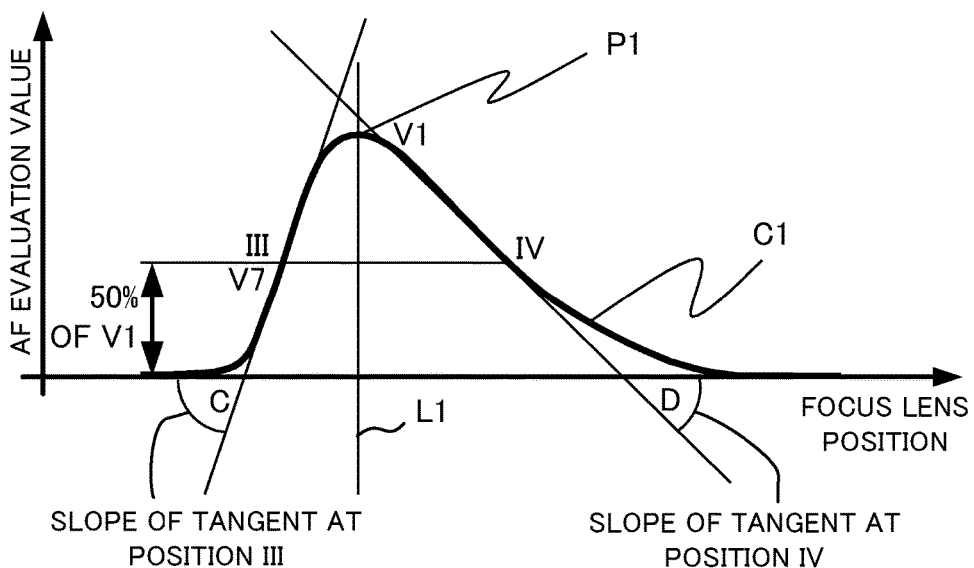

FIG. 6B is a graph for explaining another example of the method for determining the degree of the symmetry of the high-frequency component C1. In the AF evaluation value of the high-frequency component C1, two positions III and IV have AF evaluation values of V7 that is 50% (the predetermined ratio) of the AF evaluation value of V1 at the peak position P1 and are defined before and after the line L1. The position III belongs to the area D11, and the position IV belongs to the area D12.

Assume that "C" represents a tangent slope at the position III and "D" represents a tangent slope at the position IV where "C" and "D" are absolute values. Each of these slopes represents a variation amount of the contrast value per a minimum moving or stepping amount of the focus lens 101a. The storage unit in the system control unit 114 stores information of the high-frequency component C1 illustrated in FIG. 6B (or values of C and D).

When one of the slopes C and D exceeds a first value and the other of the slopes C and D does not exceed a second value, the system control unit 114 determines that the high-frequency component C1 is asymmetrical with respect to the line L1 (non-line symmetry), and sets the offset amount OFF. As expressed in the conditional expression 5, the first value is 10% (0.10) and the second value is 6% (0.06) but the first value may be 20% (0.20) and the second value may be 8% (0.08). The code and absolute value of the offset amount OFF are determined based on the direction (code) from the peak position P2 to the peak position P1 and the direction of the asymmetry of the high-frequency component C1. This configuration enables the final position of the focus lens 101a to be located in the area D12 and prevents the final position of the focus lens 101a from being located in the area D11.

$$\{C>0.10 \cap D<0.06\} \cup \{C<0.06 \cap D>0.10\} \quad (5)$$

$$\{C>0.20 \cap D<0.08\} \cup \{C<0.08 \cap D>0.20\} \quad (6)$$

Figure 12A:
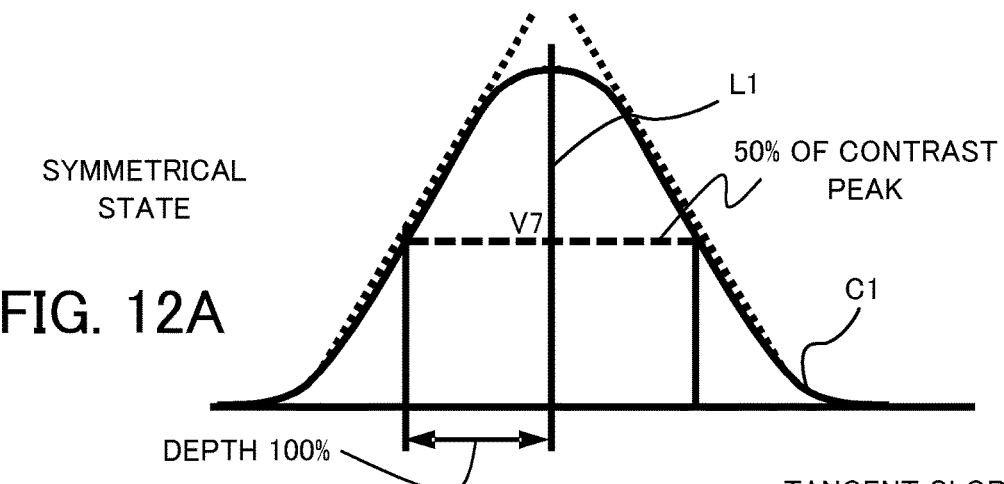
FIGS. 12A to 12C are views for explaining conditional expressions 5 and 6 according to the first embodiment.
Figure 12B:
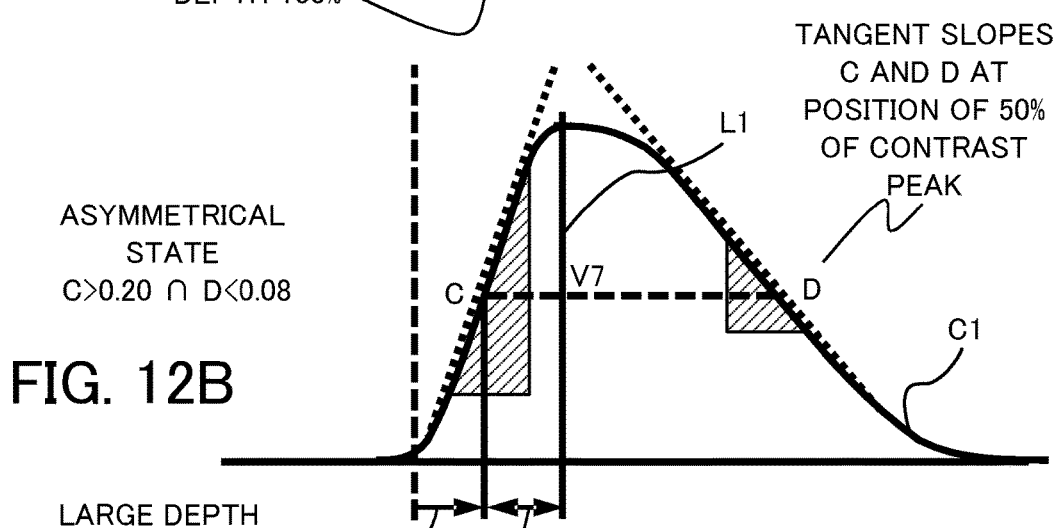
Figure 12C:
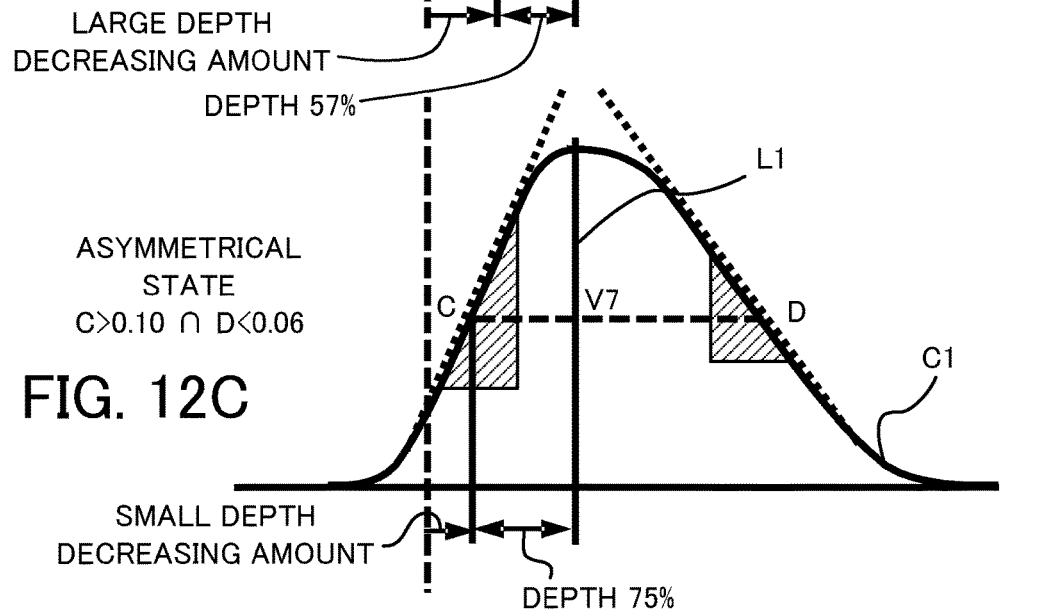

FIGS. 12A to 12C are views for explaining the basis of conditional expressions 5 and 6. FIG. 12A illustrates that the high-frequency component C1 is symmetrical with respect to the line L1. FIGS. 12B and 12C illustrate that the high-frequency components C1 is asymmetrical due to a large spherical aberration amount.

The permissible level in utilizing the slope is 50% as the predetermined ratio of the AF evaluation value V1 at the peak position P1. As illustrated in FIG. 12B, the following expression is established when one of the slopes C and D exceeds 20% and the other of the slopes C and D does not exceed 8%. In this case, the depth on one side is 2.5 times of the depth of the other side.

$$\{C=0.20 \cap D=0.08\} \cup \{C=0.08 \cap D=0.20\} \quad (7)$$

The necessary focus detecting accuracy is 50% for the depth defined by 50% of the AF evaluation value of V1. In case of the conditional expression 6, on the sharply reducing side of the contrast, the depth is narrowed down to 57% when it is assumed that the original depth is set to 100%, and the necessary focus detecting accuracy becomes 50% of the original depth and the margin becomes 7%. In such a small margin, the depth may be lower than 50% of the AF evaluation value V1 under influence of even slight disturbance.

FIG. 12C illustrates that the depth on one side is narrowed by 25% and the depth on the other side increases by 25%. At this time, the following expression is established when one of the slopes C and D before and after the peak position exceeds 10% and the other of the slopes C and D does not exceed 6%.

$$\{C>0.10 \cap D<0.06\} \cup \{C<0.06 \cap D>0.10\} \quad (8)$$

In this case, the depth on the sharply reducing side of the contrast is 75% of the original depth, and has a margin of 25% for the depth of 50% of the focus system, increasing the latitude to the disturbance.

When the conditional expressions 5 or 6 are not satisfied because the iris diaphragm is narrowed or the object distance exceeds 1000 mm, the system control unit 114 determines that the asymmetry is permissible and sets the offset amount OFF to 0 and the peak position P1 to the target position.

More specifically, the system control unit 114 determines whether the conditional expression 5 is satisfied (S52). When the conditional expression 5 is satisfied, the system control unit 114 determines whether the conditional expression 6 is satisfied (S54). When the conditional expression 6 is satisfied, the system control unit 114 sets the offset amount OFF by referring to the storage unit similarly to S24 (S56). When the conditional expression 6 is not satisfied, the system control unit 114 sets the offset amount OFF by referring to the storage unit similarly to S24 (S58) but the absolute value of the set offset amount is smaller than that set in S56. When the conditional expression 5 is not satisfied, the system control unit 114 sets the offset amount OFF to zero similarly to FIG. 5 (S60). The system control unit 114 then performs S30, S32, and S34.

In the examples illustrated in FIGS. 6A and 6B, the system control unit 114 determines whether or not the high-frequency component C1 is symmetrical with respect to the line L1 by determining whether the predetermined condition is satisfied, but the number of conditions may be increased or the offset amount OFF may be continuously changed.

It takes a long time to directly measure the depths A and B and slopes C and D of the high-frequency component C1. Accordingly, the storage unit in the system control unit 114 may store data representative of a relationship among the F-number, the object distance, and the symmetry of the high-frequency component C1 based on the designed value of the optical system 101 through an experiment and simulation. The high-frequency component may be measured by a tool in an individual adjusting step rather than the designed value.

Second Embodiment

Due to the limitation of the recent optical design freedom, the distance fluctuation of the image plane becomes remarkable, for example, the peripheral image plane is likely to bend in the under direction at the close distance. Where the in-focus position at the center is shifted by the predetermined amount SA1 in order to mitigate this curvature of field and to keep a balance with the peripheral image quality, the image quality deterioration becomes more problematic than an effect of mitigating the curvature of field if the shift direction is located in the area D11. The predetermined amount SA1 is determined by the characteristic information of the image pickup optical system.

Figure 7:
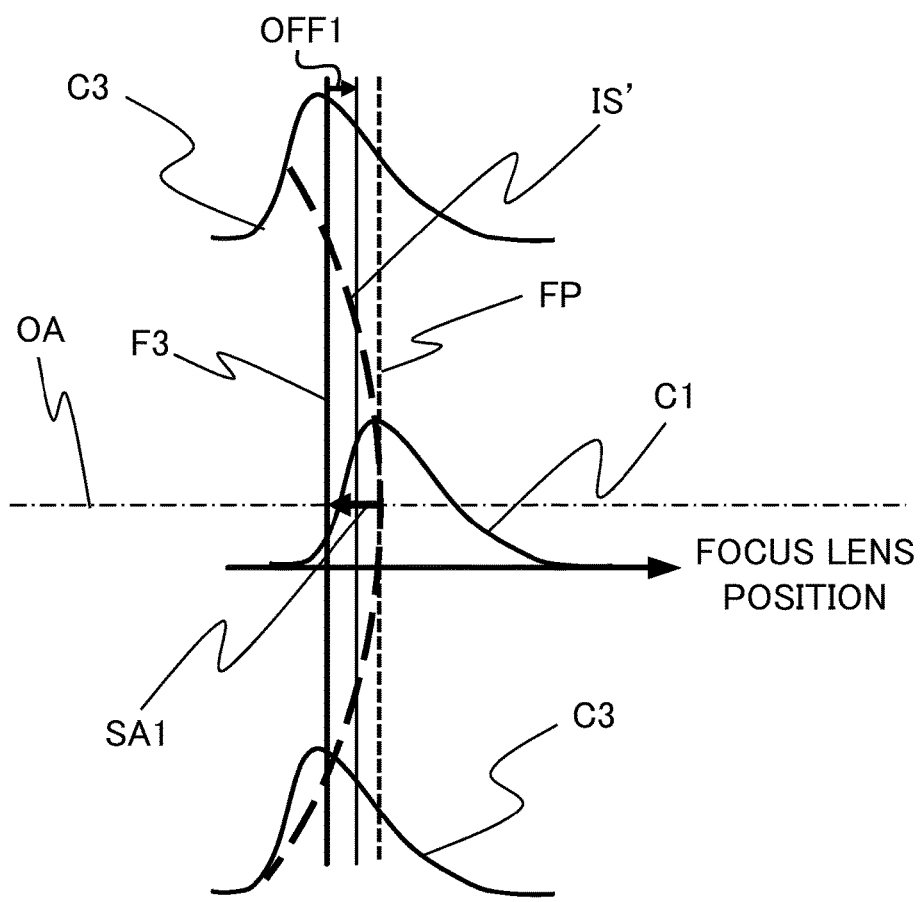
FIG. 7 is a graph for explaining a focusing method according to a second embodiment of the present invention.

FIG. 7 is a view for explaining a contrast AF according to a second embodiment for reducing the influence of the curvature of field. The system control unit 114 in this embodiment also moves the focus lens 101a but the predetermined amount SA1 is not the predetermined amount SA illustrated in FIGS. 2A and 2B.

In FIG. 7, the abscissa axis denotes the position of the focus lens 101a (the right direction is set to positive), and can represent a defocus amount when the in-focus position FP is set to 0. The broken line IS represents a curved image plane, and an alternate long and short dash line OA represents the optical axis or the center of the image. C1 represents the high-frequency component at the center of the image, and C3 represents the high-frequency component in the periphery of the image. C1 and C3 have the same spatial frequencies. The high-frequency component C1 is similar to that illustrated in FIGS. 2A and 2B. Each of the longitudinal directions of the high-frequency components C1 and C3 represents an AF evaluation value (where the upper direction is positive).

In each of the high-frequency components C1 and C3, an area having a steep slope is located on the left side with respect to the line that passes the peak position and extends in the longitudinal direction and an area having a moderate slope is located on the right side. This is merely illustrative, and the area having a steep slope may be located on the right side and the area having the moderate slope may be located on the left side depending on the characteristic of the optical system 101. The shapes of the high-frequency components C1 and C3 do not perfectly accord with each other but are similar to each other.

When a curvature of field occurs due to short-range image pickup etc., a focus state is different between the center and the periphery in the image and the peripheral image quality may drop. In FIG. 7, the peripheral image plane falls in the negative direction of the defocus. Although the high-frequency component C1 has a high AF evaluation value at the in-focus position FP illustrated by the current dotted line, the AF evaluation value of the high-frequency component C3 is not so high. In this case, the system control unit 114 moves the focus lens 101a in a direction so as to reduce the image quality at the image center and to improve the peripheral image quality.

In order to increase the AF evaluation value of the high-frequency component C3, when the focus lens 101a is moved from the in-focus position FP to a position that is offset from the focus lens position (first position) corresponding to the peak position P1 of the high-frequency component C1 by the predetermined amount SA1, a focus position F3 is formed as illustrated by a solid line. Thereby, the AF evaluation value of the high-frequency component C3 improves. However, the AF evaluation value of the high-frequency component C1 significantly drops in the steep slope area and the image quality at the center of the image significantly deteriorates.

Accordingly, the system control unit 114 according to the second embodiment moves the focus lens 101a from the peak position P1 by the amount made by adding an offset amount OFF1 reverse to the moving amount SA1, to the predetermined amount SA1. The system control unit 114 sets the offset amount so that a minimum value of the AF evaluation value at the center in the image obtained when the focus lens is moved by a sum of the offset amount and the predetermined amount is higher than that obtained when the focus lens is moved by the predetermined amount. Similar to the first embodiment, the setting method of the offset amount OFF1 can use a ratio of A/B and absolute values of C and D.

The system control unit 114 sets the offset amount OFF1 so that the absolute value of the offset amount OFF1 when the F-number of the diaphragm 101b is equal to or higher than the threshold can be smaller than the absolute value of the offset amount OFF1 when the F-number of the diaphragm 101b is smaller than the threshold. The offset amount OFF1 is adjusted based on the F-number because the spherical aberration is proportional to the third power of the F-number whereas the curvature of field is proportional to the first power of the F-number. Therefore, when the aperture of the diaphragm 101a is narrowed, only the curvature of field is left and the asymmetry is less influential. As the F-number reduces, the absolute value of the predetermined amount SA1 may be set smaller but the proportional relationship is not always necessary. The system control unit 114 may set the offset amount so that the moving amount (absolute value) of the focus lens 101a for a first F-number is smaller than the moving amount (absolute value) of the focus lens 101a for a second F-number larger than the first F-number. Similar to the first embodiment, the system control unit 114 may set the absolute value of the offset amount when the object distance is equal to or longer than the threshold, to be smaller than the absolute value of the offset amount when the object distance is smaller than the threshold.

The storage unit in the system control unit 114 may store the relationship among the F-number, the object distance, and the offset amount. The system control unit 114 may acquire information of the F-number and the object distance, and may acquire the offset amount corresponding to the acquired F-number and the object distance from the storage unit.

The system control unit 114 may include a plurality of processors, such as CPUs, and separate processors and software may be used to set the offset amount and to move the focus lens or a dedicated hardware may set an offset amount etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-118883, filed Jun. 12, 2015, which is hereby incorporated by reference herein in its entirety.

What is claimed is:

1. An autofocus apparatus capable of executing automatic focus detection of an image pickup optical system, the apparatus comprising:
   a control unit configured to set an offset amount based on information relating to a shape of a first high-frequency component of an image signal obtained by photoelectrically converting an object image formed by the image pickup optical system that includes a focus lens while driving the focus lens, and to move the focus lens to a second position that shifts from a first position of the focus lens by a sum of the offset amount and a predetermined amount that is determined by characteristic information of the image pickup optical system, the characteristic information of the image pickup optical system being a characteristic of an imaging position due to an aberration of the image pickup optical system,
   wherein at least one processor or circuit is configured to perform a function of the control unit.

2. The autofocus apparatus according to claim 1, wherein the first high-frequency component has an asymmetrical shape with respect to a position of the focus lens corresponding to a peak position of a contrast value of the first high-frequency component when the first high-frequency component is illustrated on a graph where an ordinate axis represents the contrast value and an abscissa axis represents the position of the focus lens, and
   wherein the control unit sets the offset amount so that a minimum value of the contrast value of the first high-frequency component obtained when the focus lens is moved from the first position by a sum of the offset amount and the predetermined amount is higher than that obtained when the focus lens is moved from the first position by the predetermined amount.

3. The autofocus apparatus according to claim 1, further comprising a detecting unit configured to detect a peak position of a contrast value of a second high-frequency component having a spatial frequency lower than that of the first high-frequency component, extracted from the image signal,
wherein the first position is a position of the focus lens corresponding to the peak position detected by the detecting unit.

4. The autofocus apparatus according to claim 1, wherein the image pickup optical system includes a diaphragm configured to adjust a light quantity, and
wherein the information relating to the shape of the first high-frequency component contains at least one of information of an F-number of the diaphragm and information of an object distance.

5. The autofocus apparatus according to claim 4, further comprising a storage unit configured to store information of a relationship among the F-number, the object distance, and the offset amount,
wherein the control unit acquires the information of the F-number and the information of the object distance, and acquires the offset amount corresponding to the acquired information of the F-number and the object distance from the storage unit.

6. The autofocus apparatus according to claim 4, wherein the control unit sets an absolute value of the offset amount when the F-number is equal to or larger than a threshold, to be smaller than that when the F-number is smaller than the threshold.

7. The autofocus apparatus according to claim 4, wherein the control unit sets an absolute value of the offset amount when the object distance is equal to or longer than a threshold, to be smaller than that when the object distance is smaller than the threshold.

8. The autofocus apparatus according to claim 1, wherein the information relating to the shape of the first high-frequency component is information of a ratio of distances between a position of the focus lens corresponding to a peak position of the first high-frequency component and a position of the focus lens corresponding to each of two positions of the first high-frequency component having a predetermined ratio of the contrast value at the peak position of the first high-frequency component.

9. The autofocus apparatus according to claim 8, wherein the ratio is 1 or smaller, and
wherein the control unit sets an absolute value of the offset amount when the value of the ratio is larger than the threshold, to be smaller than that when the value of the ratio is equal to or smaller than the threshold.

10. The autofocus apparatus according to claim 9, wherein the predetermined ratio is 70% and the ratio is 0.6.

11. The autofocus apparatus according to claim 1, wherein the information relating to the shape of the first high-frequency component is information of an absolute value of a slope of a tangent at a position of the focus lens corresponding to each of two positions of the first high-frequency component having a predetermined ratio of the contrast value at the peak position of the first high-frequency component.

12. The autofocus apparatus according to claim 11, wherein the control unit sets an absolute value of the offset amount when one of absolute values of two slopes is higher than a first threshold and the other of the absolute values of the two slopes is lower than a second threshold, to be larger than that when one of the absolute values of two slopes is higher than a third threshold higher than the first threshold and the other of the absolute values of two slopes is lower than a fourth threshold higher than the second threshold.

13. The autofocus apparatus according to claim 12, wherein the predetermined ratio is 50%, the first threshold is 0.10, the second threshold is 0.06, the third threshold is 0.20, and the fourth threshold is 0.08.

14. The autofocus apparatus according to claim 1, wherein the predetermined amount is an amount to improve peripheral image quality of the image signal.

15. The autofocus apparatus according to claim 14, wherein the first position is an in-focus position of the focus lens corresponding to an object at a center of an image in the image signal.

16. The autofocus apparatus according to claim 14, wherein the image pickup optical system includes a diaphragm configured to adjust a light quantity, and
wherein the information relating to the shape of the first high-frequency component contains at least one of information of an F-number of the diaphragm and information of an object distance.

17. The autofocus apparatus according to claim 14, wherein the image pickup optical system includes a diaphragm configured to adjust a light quantity, and
wherein the control unit sets an absolute value of the offset amount when the F-number is equal to or larger than the threshold, to be smaller than that when the F-number is smaller than the threshold.

18. An optical apparatus comprising:
an autofocus apparatus capable of executing automatic focus detection of an image pickup optical system, wherein the autofocus apparatus includes a control unit configured to set an offset amount based on information relating to a shape of a first high-frequency component of an image signal obtained by photoelectrically converting an object image formed by the image pickup optical system that includes a focus lens while driving the focus lens, and to move the focus lens to a second position that shifts from a first position of the focus lens by a sum of the offset amount and a predetermined amount that is determined by characteristic information of the image pickup optical system, the characteristic information of the image pickup optical system being a characteristic of an imaging position due to an aberration of the image pickup optical system,
wherein at least one processor or circuit is configured to perform a function of the control unit.

* * * * *